(12) United States Patent
Jouard (10) Patent No.: US 7,661,197 B2
(45) Date of Patent: Feb. 16, 2010

(54) METHOD OF READING THE OUTLINE OF THE BEZEL OF A RIM OF AN EYEGLASS FRAME

(75) Inventor: Ludovic Jouard, Charenton (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 89 days.

(21) Appl. No.: 12/094,620

(22) PCT Filed: Nov. 20, 2006

(86) PCT No.: PCT/FR2006/002545

§ 371 (c)(1),
(2), (4) Date: May 22, 2008

(87) PCT Pub. No.: WO2007/060315

PCT Pub. Date: May 31, 2007

(65) Prior Publication Data

US 2008/0289200 A1    Nov. 27, 2008

(30) Foreign Application Priority Data

Nov. 23, 2005    (FR) .................................. 05 11842

(51) Int. Cl.
*G01B 5/20* (2006.01)
(52) U.S. Cl. ................ 33/200; 33/28; 33/507
(58) Field of Classification Search .................. 33/200, 33/28, 507, 503

See application file for complete search history.

(56) References Cited

U.S. PATENT DOCUMENTS 5,615,486 A * 4/1997 Igarashi et al. ............... 33/200
5,669,150 A 9/1997 Guertin et al.
5,881,467 A 3/1999 Clara et al.
6,263,583 B1 * 7/2001 Mizuno ............................ 33/28
7,467,472 B2 * 12/2008 Jacq ............................. 33/200
7,500,316 B2 * 3/2009 Haddadi ....................... 33/200
7,571,545 B2 * 8/2009 Nauche et al. ............... 33/200
2002/0166247 A1 * 11/2002 Andrews et al. ............. 33/200
2008/0022539 A1 * 1/2008 Haddadi ....................... 33/200
2008/0216330 A1 * 9/2008 Jacq ............................. 33/200

(Continued)

FOREIGN PATENT DOCUMENTS

DE    39 33 940 A1    4/1990

(Continued)

*Primary Examiner*—Yaritza Guadalupe-McCall
(74) *Attorney, Agent, or Firm*—Young & Thompson (57) ABSTRACT

A method of reading the outline of the bezel of a rim of an eyeglass frame, includes contacting the bottom of the bezel and a feeler finger (9) belonging to a feeler (8) and pointing along a feeler axis (C) or with a feeler blade belonging to a feeler and extending in a feeler plane, and moving the feeler along the bezel In order to feel the bottom of the bezel by turning about an axis of rotation. The invention, the feeler blade or finger, at least when located in a temple zone of the rim of the frame, points obliquely towards the rim of the frame and towards its rear side that is to be placed facing the eyes of a wearer, such that its feeler axis or its feeler plane forms a non-zero feeler angle (A1) with a plane orthogonal to the axis of rotation of the feeler.

25 Claims, 9 Drawing Sheets

U.S. PATENT DOCUMENTS

2009/0140036 A1 * 6/2009 Haddadi .................. 33/200

FOREIGN PATENT DOCUMENTS

| | | |
|---|---|---|
| DE | 101 35 649 A1 | 2/2003 |
| EP | 0 689 900 A1 | 1/1996 |
| EP | 0 819 967 A1 | 1/1998 |
| EP | 1 037 008 A2 | 9/2000 |
| FR | 2 777 817 | 10/1999 |

* cited by examiner

METHOD OF READING THE OUTLINE OF THE BEZEL OF A RIM OF AN EYEGLASS FRAME

TECHNICAL FIELD TO WHICH THE INVENTION RELATES

The present invention relates in general to measuring dimensions as is required during the fabrication of a pair of eyeglasses adapted to a particular wearer.

More particularly, the invention relates to a method of reading the outline of a bezel of a rim of an eyeglass frame, the method including a contacting step of putting the bottom of the bezel into contact with a feeler finger belonging to a feeler and pointing along a feeler axis or with a feeler blade belonging to a feeler and extending along a feeler plane, and a feeling step during which the feeler is moved along the bezel to feel the bottom of the bezel while turning about an axis of rotation.

A particularly advantageous application of the invention lies in its application to eyeglasses having frames that are strongly curved.

TECHNOLOGICAL BACKGROUND

The technical portion of the work performed by an optician consists in mounting a pair of ophthalmic lenses in a frame selected by a wearer. Such mounting is made up of five main operations:

reading the outlines of the bezels of the rims of the frame selected by the wearer, i.e. the outline of the groove going around the inside of each of the rims of the frame;

centering each lens, which consists in determining the position that each lens is to occupy in the frame so as to be appropriately centered relative to the wearer's eye;

feeling each lens, which consists in determining the coordinates of points characterizing the shape desired for the outline of the lens; then shaping each lens, which consists in machining or cutting its outline to the desired shape, given the defined centering parameters; and finally beveling, which consists in forming a bevel that is to hold the lens in the bezel included in the frame.

In the context of the present invention, it is the first operation of reading the outlines of the bezels of the rims of the frame that is of interest. Specifically, the optician needs to feel the inner outline of the rims of the selected eyeglass frame in order to determine accurately the coordinates of points characterizing the outline of the bottom of the bezel. Knowledge of this outline enables the optician to deduce the shape that is to be presented by each of the lenses once they have been shaped and beveled so as to enable them to be mounted in the frame.

In general, in order to perform this operation, the optician makes use of a bezel outline reader appliance of the kind described in document EP 0 819 967 or as described in document EP 1 037 008. Those appliances have a feeler suitable for pivoting about an axis of rotation that is normal to the mean plane of the frame and that comprises a feeler finger pointing along an axis orthogonal to said axis of rotation. The feeler finger includes in particular an end that is suitable for being inserted into the bezel in order to determine the three-dimensional coordinates of the outline of the bezel.

The particular purpose of this operation is to follow very exactly the bottom of the bezel included in each of the rims that is to be read so as to be capable of storing an accurate digital image of the shape of the bezel.

The Applicant has found that with certain shapes and sizes of frames, and in particular with frames that are strongly curved (i.e. present a large amount of curvature), known reading methods do not give complete satisfaction which can lead to difficulties in mounting lenses on frames of that type.

OBJECT OF THE INVENTION

The object of the present invention is to provide an outline reading method that is not only more accurate, but that is also more versatile, i.e. that is capable of reading a wider range of frame shapes and sizes.

More particularly, the invention provides a method of reading the outline of a bezel in which provision is made for the feeler blade or finger, at least when located in a temple zone of the rim of the frame, to point obliquely towards the rim of the frame and towards its rear side that is to be placed facing the eyes of a wearer, such that the feeler axis or the feeler plane forms a non-zero feeler angle with a plane orthogonal to the axis of rotation of the feeler.

Thus, by means of the invention, the end of the feeler finger of the feeler remains in contact with the bottom of the bezel. The Applicant has found that error in reading the bezel comes from the fact that under certain conditions the reader endpiece of the feeler finger cannot reach the bottom of the bezel.

When the frame of a pair of eyeglasses presents strong curvature (the frame is said to be strongly curved), often for reasons of appearance, the bezel also presents a large amount of curvature. Furthermore, this curvature is generally associated with the bezel being twisted. Under such circumstances, it is said that the bezel of the eyeglass frame is locally "skewed".

That is why, when reading the outline of a bezel of a rim of such eyeglasses, since the feeler axis is parallel to the general plane of the frame, the feeler finger comes into contact with the side of the bezel being read. This mechanical conflict between the feeler finger and the side of the bezel consequently prevents the end of the feeler finger from reaching the bottom of the bezel. The end of the feeler finger then slides along a side surface of the bezel. Unfortunately it is the shape of the bottom of the bezel that needs to be acquired. This sliding thus falsifies the reading of the bottom of the bezel.

The appropriately chosen angle of inclination for the feeler finger serves to remedy that problem since when the frame is strongly skewed, it no longer interacts with the side of the bezel being read, thus enabling the end of the finger to feel to the bottom of the bezel.

According to a first characteristic of the invention, during the feeling step, the feeler blade or finger when placed in a nose zone of the rim of the frame points obliquely either towards the rim of the frame and towards its rear side, or else towards the rim of the frame and towards its front side with a feeler angle of less than 20 degrees.

Advantageously, during the feeling step, the feeler blade or finger points obliquely towards the rim of the frame and towards its rear side regardless of the location on the rim at which it is disposed.

According to another characteristic of the outline reading method of the invention, prior to the contacting step, provision is made for positioning the eyeglass frame relative to the axis of rotation independently of its greatest overall dimension.

Advantageously, the greatest overall dimension of the rim of the frame lies in the range 125 millimeters (mm) to 150 mm.

Advantageously, during the feeling step, the feeler turns through 360 degrees about its axis rotation.

Advantageously, prior to the contacting step of making contact, a step is performed of blocking the frame in holder means that define a general plane orthogonal to the axis of rotation of the feeler.

According to another advantageous characteristic of the invention, during the feeling step, the feeler blade or finger, when it is placed in the temple zone of the rim of the frame, points obliquely towards the rim of the frame and towards its rear side with a feeler angle that is less than or equal to 40 degrees.

Furthermore, during the feeling step, there is at least one occasion on which the feeler points obliquely towards the rim of the frame and towards its rear side with a feeler angle that is greater than or equal to 5 degrees.

Thus, firstly the feeler is adapted to be inclined sufficiently, at least in that zone of the rim (temple zone) that is the most curved relative to the general plane (coinciding with the general plane of the frame) and secondly, it is adapted not to be inclined excessively so that it can read the rim in zones that are curved little or not at all relative to the general plane of the frame (nose zone). Consequently, the feeler angle presented by the feeler avoids any mechanical interference between the feeler and the rim of the frame, regardless of the rim that is being read.

Advantageously, the feeling step is performed by causing a substantially spherical reader endpiece at the terminal end of the feeler finger to slide along the bottom of the bezel of the rim of the eyeglass frame. Under such circumstances and advantageously, the terminal end of the feeler finger presents thickness that is less than the diameter of the reader endpiece.

Thus, the reader endpiece becomes inserted more easily into the bezel of the frame, with this small size for the terminal end of the feeler contributing to avoiding any mechanical interference between the feeler and the rim of the frame.

According to an advantageous characteristic of the invention, the feeler angle is not changed while reading the rim of the frame. In which case, advantageously, the feeler angle lies in the range 10 degrees to 20 degrees, and is preferably 15 degrees.

Thus, such a value for the feeler angle makes it possible equally well to read the rim of a frame in a zone that is very inclined and also in a zone that is not inclined. This value also makes it possible to read the outlines of bezels of the rims of frames that present little curvature.

Advantageously, the feeler finger is removable.

Thus, if the feeler finger breaks or becomes damaged, it can be changed easily. It can also be changed for a feeler finger that presents a feeler angle that is different and better suited to the eyeglass frame that is to be felt.

According to a particularly advantageous characteristic of the invention, the feeler has at least two interchangeable feeler fingers that, when mounted, present different feeler angles.

Thus, when the optician can see visually that the frame for reading is highly curved, it is possible to change the feeler finger that was initially mounted on the feeler for a feeler finger that is better adapted to the curvature of the frame that is to be read.

According to another characteristic of the invention, the feeler has a plurality of feeler fingers that can be activated selectively.

Thus, one feeler finger can be changed for another feeler finger automatically and without manual action on the part of the optician. Furthermore, after the rim of the frame has been felt for a first time, if an error is detected in the reading of the outline, it is possible optionally to feel the rim of the frame a second time, after automatically changing the feeler finger.

In a second implementation of the invention, the feeler angle is caused to vary during the feeling step. In which case, advantageously, the feeler angle is at a maximum when the feeler is feeling the temple zone of the rim of the frame and at a minimum when the feeler is feeling the nose zone of the rim of the frame.

Thus, the feeler angle can vary while reading a rim in such a manner as to adapt accurately and automatically to the shape of the rims of the eyeglass frame to be read.

Advantageously, in this variant implementation, for a feeler having a plurality of feeler fingers that are selectively activatable, provision is made to activate at least two distinct feeler fingers selectively during the feeling step.

Thus, in order to adapt to the shape of the frame, the initially active feeler finger can be changed during reading for a finger that is better adapted to the camber of the zone being read by the feeler.

Also advantageously, during the feeling step, provision is made to cause the feeler angle to vary continuously as a function of the three-dimensional position of the feeler finger.

Thus, in order to adapt to the shape of the rim, the feeler finger can vary continuously in such a manner as to adapt automatically and very accurately to the curvature of the zone being read by the feeler. Consequently, it is possible in real time to adapt the orientation of the feeler finger to the orientation of the bezel of the rim that is to be read. Any possibility of interference between the feeler finger and the rim for reading is consequently avoided.

Advantageously, when the feeler is mounted to pivot about a carrier axis parallel to the axis of rotation, the feeler blade or finger points towards the outside of the circle described by the feeler turning about the carrier axis with a non-zero angle relative to its circumferential direction about said carrier axis.

Advantageously, the feeler blade or finger points towards the outside of the circle described by the feeler about the carrier axis with an angle lying in the range 10 degrees to 20 degrees, and preferably equal to 15 degrees, relative to its circumferential direction about said carrier axis.

Thus, even if the feeler finger does not point in a direction that is radial relative to the carrier axis, the feeler finger is still generally perpendicular to the direction that is tangential to the outline of the bezel, as seen in projection onto a plane orthogonal to the carrier axis.

Advantageously, the feeler is moved by motor means controlled by electronic and/or computer means in such a manner that the feeler blade or finger remains continuously in contact with the bottom of the bezel.

Advantageously, the eyeglass frame is strongly curved and presents, between its general plane and an axis passing through two points of the bezel and presenting the greatest angle of inclination relative to the general plane, an angle of curvature that is greater than 20 degrees.

DETAILED DESCRIPTION OF AN EMBODIMENT

The following description with reference to the accompanying drawings that are given by way of non-limiting example makes it clear what the invention consists in and how it can be implemented.

Figure 1:
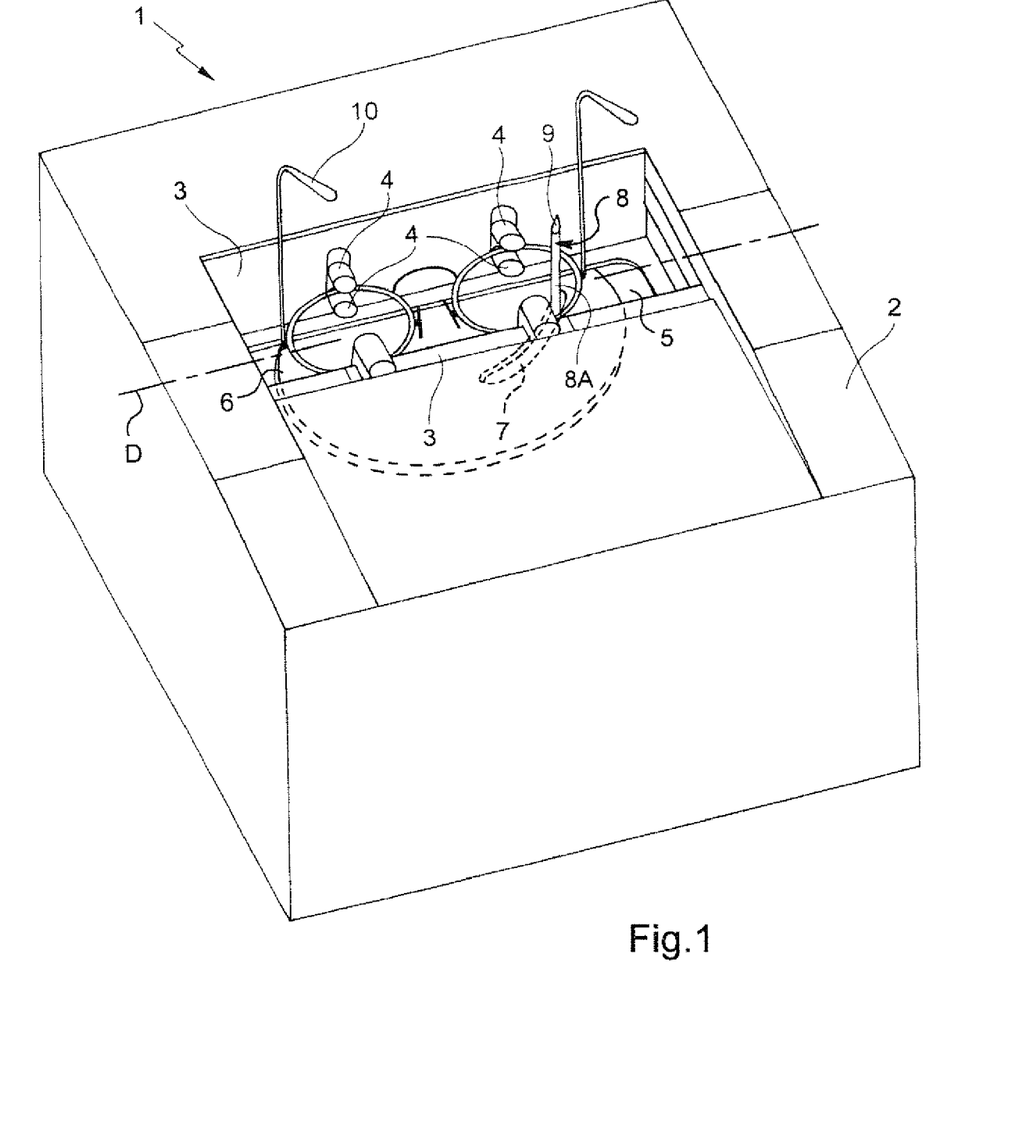
FIG. 1 is a perspective view of an outline reader appliance receiving an eyeglass frame from which the shapes of the rims are to be read by a feeler.

In the accompanying drawings:

FIG. 1 is a general view of a first embodiment of an outline reader appliance 1 as it appears to its user. This appliance includes a top cover 2 covering the entire appliance with the exception of a central top portion.

The outline reader appliance 1 also has a set of two jaws 3 in which at least one of the jaws 3 is movable relative to the other so that the jaws 3 can be moved together or apart relative to each other so as to form a clamp device. Each of the jaws 3 is also provided with two pincers, each made up of two movable studs 4 suitable for clamping between them an eyeglass frame 10. The frame 10 can then be held stationary on the outline reader appliance 1. The points of contact between the studs 4 of a given pincer define a general plane K corresponding to the general plane of the frames 10 when they are disposed in the outline reader appliance 1.

The term "general plane K" of the frame 10 is used to mean the plane that is normal to the plane of symmetry of the frame 10 and that contains the points where the frame bears against the studs 4.

In the space left visible by the central top opening in the cover 2, there can be seen a structure 5. A plate (not visible) can move in translation on the structure 5 along a transfer axis D. A turntable 6 is mounted to turn on the plate 6. The turntable 6 is thus suitable for taking up two positions on the transfer axis D: a first position in which the center of the turntable 6 is located between the two pairs of studs 4 holding the rim corresponding to the right eye of the frame 10; and a second position in which the center of the turntable 6 is located between the two pairs of studs 4 holding the rim corresponding to the left eye of the frame 10.

The turntable 6 possesses an axis of rotation B defined as being the axis normal to the front face of the turntable 6 and passing through its center. The position of this axis relative to the frame 10 is consequently independent of the greatest overall dimension of the frame 10.

The turntable 6 also includes an oblong slot 7 of circularly arcuate shape through which there projects a feeler 8 comprising a support rod 8A, and at its end, a feeler finger 9 provided with a reader endpiece 9C for following the outline of the frame 10 being felt by making contact therewith.

The turntable 6 is guided in rotation about its axis of rotation B by three guide wheels (not shown) disposed regularly around its periphery and held against the turntable of the outline reader appliance 1. Alternatively, these wheels can be controlled by a motor-encoder (not shown) enabling the turntable 6 to be turned under control and enabling its angular position T to be read at any time.

In this example, it can be seen that the circularly arcuate slot 7 is of a length that corresponds approximately to the radius of the turntable 6 and that it extends between the center of the turntable 6 and its periphery. The circular arc described by the slot 7 is centered on a carrier axis A.

Figure 2:
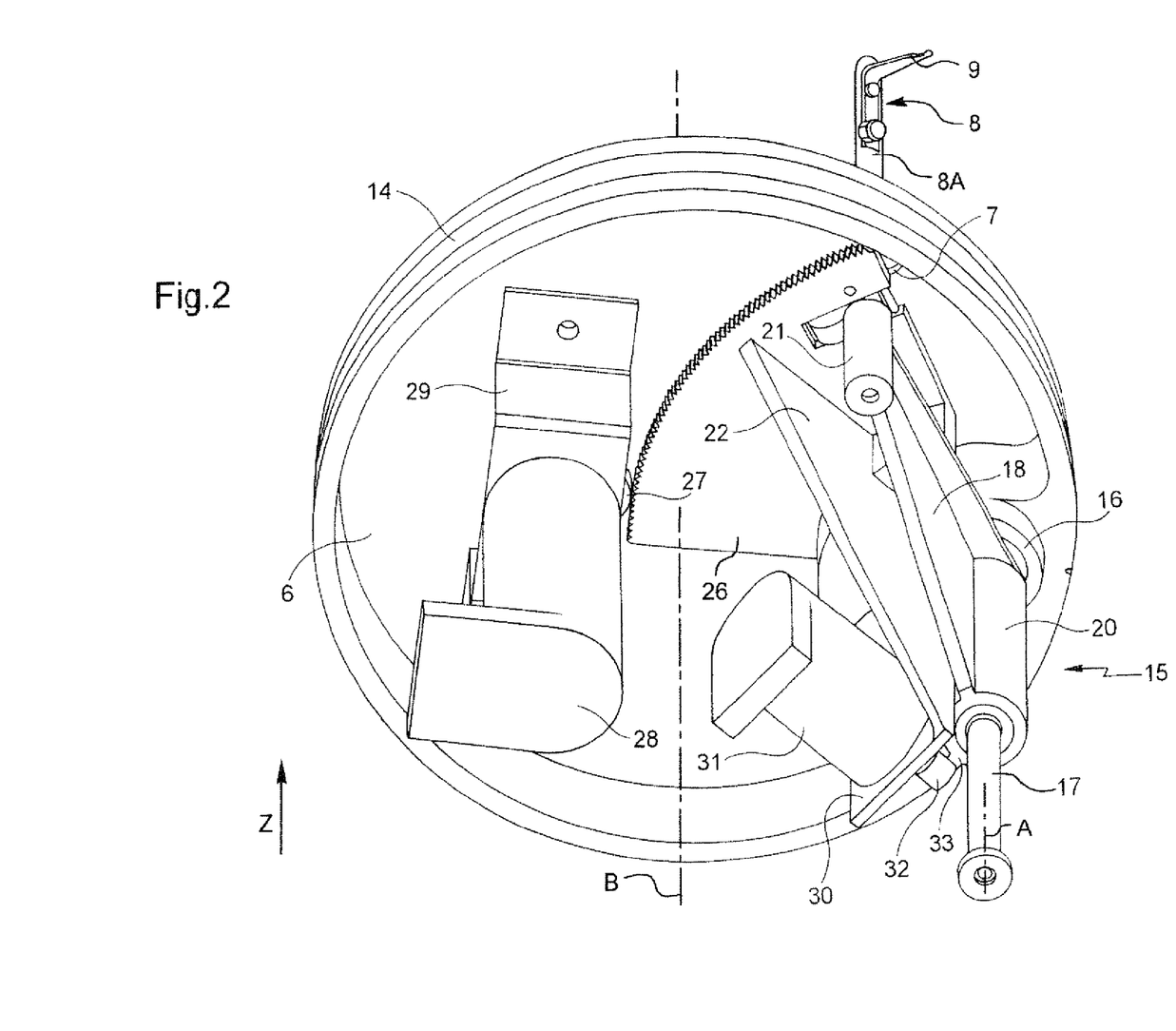
FIGS. 2 and 3 are perspective views of the underside of the turntable taken from the FIG. 1 appliance, these FIGS. 2 and 3 showing the reader subassembly carried by the turntable as viewed from two different angles.
Figure 3:
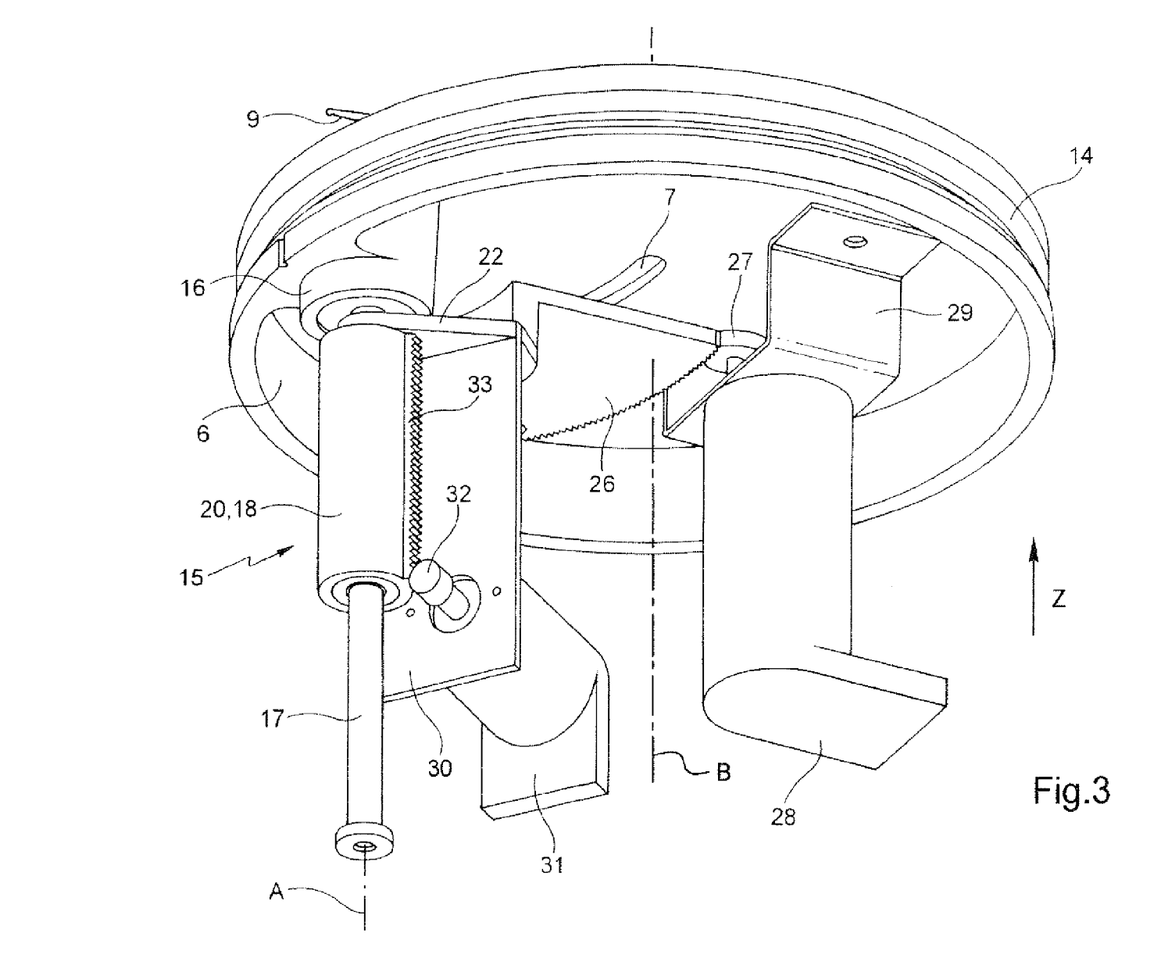

After the appliance 1 has been disassembled, the turntable 6 can be extracted from the structure 5. It then appears as shown in FIGS. 2 and 3. The perspective view of FIG. 2 shows a groove 14 disposed in the edge face of the turntable 6, all around its circumference. The groove 14 co-operates with the guide wheels of the plate. The turntable 6 carries a reader subassembly 15. FIGS. 2 and 3 show the reader subassembly 15 seen from two different viewing angles. The reader subassembly 15 includes a bearing 16 mounting a carrier shaft 17 mounted to rotate relative to the turntable 6. This carrier shaft 17 has the carrier axis A as its axis.

With reference to FIG. 2, a carrier arm 18 is mounted on the carrier shaft 17. At one of its ends, the carrier arm 18 carries a sleeve 20 enabling the carrier arm 18 to turn about the carrier axis 4 and also enabling it to move in translation along said axis. At its end remote from the sleeve 20, the carrier arm 18 has a cylindrical support 21 carrying the support rod 8A of the feeler 8 in such a manner as to ensure that the axis of the support rod 8A remains parallel to the carrier axis A.

This setup enables the feeler 8 to move following the circular arc of the slot 7, in a plane orthogonal to the axis of rotation B of the turntable 6, the axis of rotation B being parallel to the axis A in this example. Furthermore, the feeler 8 can perform retraction and extension movement relative to the front face of the turntable 6 when the carrier arm 18 slides along the axis A.

The reader subassembly 15 also has a guide arm 22 attached to the base of the shaft 17. The length of the guide arm 22 is sufficient to reach the slot 7. The guide arm 22 has a toothed semicircular portion 26 centered on the carrier axis A. The teeth of the semicircular portion 26 engage with an intermediate gearwheel 27, in turn meshing with the gearwheel (not shown) of a motor-encoder 28 mounted on a bracket 29 that is secured to the turntable 6. The teeth of the intermediate gearwheel 27 are not shown in order to keep the figures clear. The guide arm 22 has a vertical bracket 30 extending parallel to the carrier axis A, and having fastened thereon a motor-encoder 31 with a gearwheel 32 that meshes with a rack 33 extending along the sleeve 20 of the carrier arm 18. The rack 33 extends parallel to the carrier axis. The teeth of the gearwheel 32 are not shown for the same reasons of clarity as above.

The motor-encoder 28 is thus suitable for causing the feeler 8 to pivot about the carrier axis A. It thus enables a transverse force Ft to be exerted on the feeler 8 along a force axis E. This force axis E is defined as being the axis passing through the axis of the support rod 8A and tangential to the circular arc described by the slot 7.

The motor-encoder 31 is suitable for moving the feeler in translation along an axis parallel to the carrier axis A. It thus serves to exert a weight-compensation torque Cz inducing an axial force Fa on the feeler 8 along an axis parallel to the carrier axis A.

These axial and transverse forces Fa and Ft thus serve to deliver an overall force F on the feeler. The axial force Fa thus corresponds to the axial component of the overall force F and the transverse force Ft corresponds to the transverse component of the overall force F.

Figure 4A:
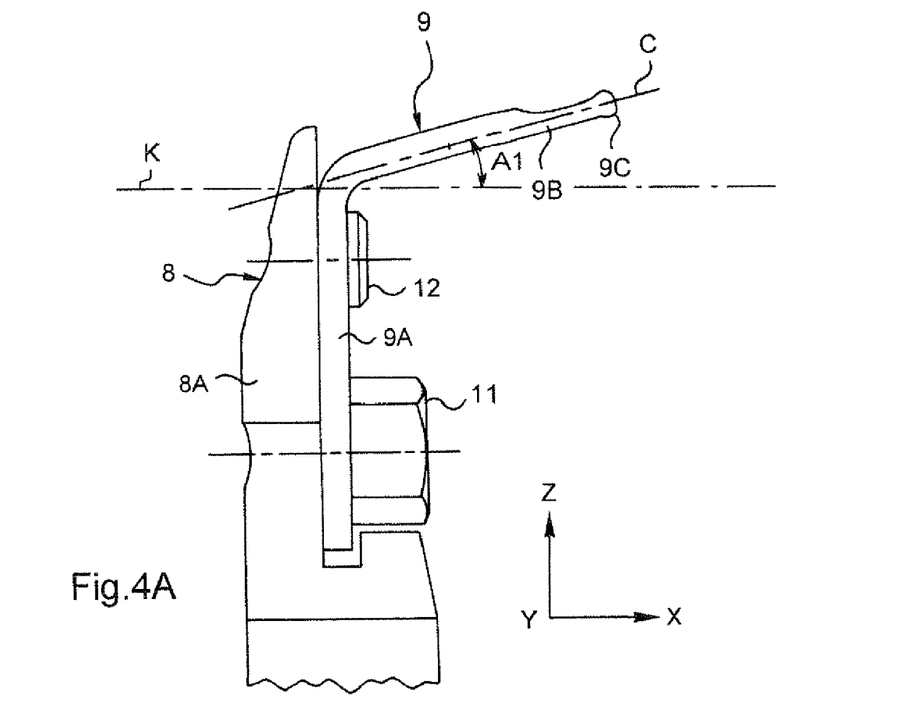
FIGS. 4A and 4B are a side view and a plan view of the feeler.
Figure 4B:
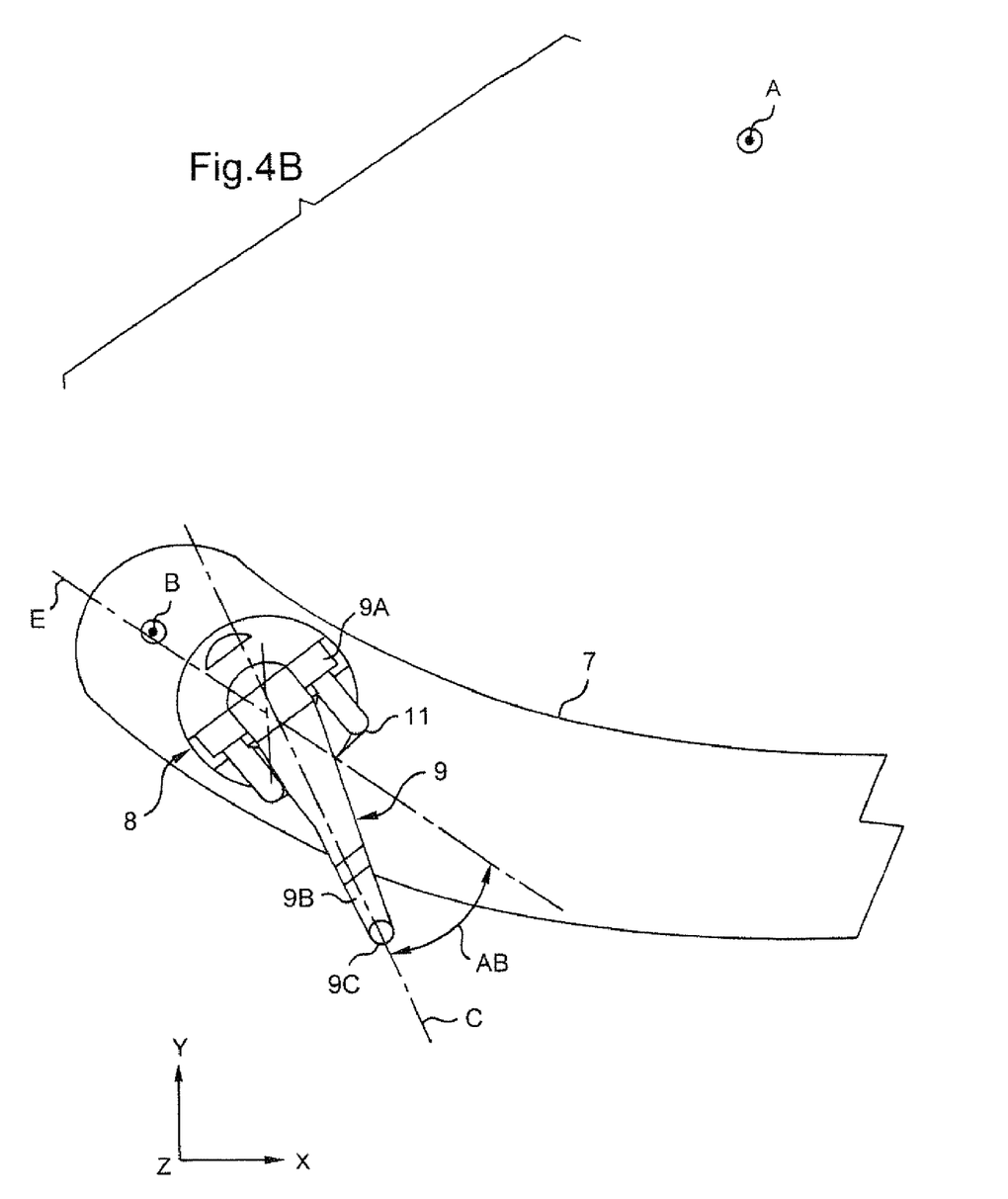

FIGS. 4A and 4B show the top end of the feeler 8 including the feeler finger 9. This feeler finger 9 has two functional ends. Firstly, at a first end, it has a support 9A of substantially rectangular shape. This support 9A enables the feeler finger 9 to be fastened to the support rod 8A of the feeler 8 by fastener means 11, 12. In this example the fastener means 11, 12 comprise a centering stud 12 and a screw co-operating with a tapped hole pierced in the support rod 8A. Consequently, the feeler finger 9 can be removed.

The feeler finger 9 is also provided at its second end, i.e. its terminal end 9B, with a reader endpiece 9C that is substantially spherical and that is designed to co-operate with the bottom of the bezel 10A of the frame 10. Going from the support 9A towards the terminal end 9B, the feeler finger 9 presents an elongate shape that tapers. Thus, seen in profile in the XY plane, the reader endpiece 9C presents a diameter that is greater than the thickness of the terminal end 9B. This characteristic makes it possible to avoid the terminal end 9B interfering with the frame 10, which would prevent contact between the reader endpiece 9C and the bottom of the bezel 10A of the frame 10.

Figure 5:
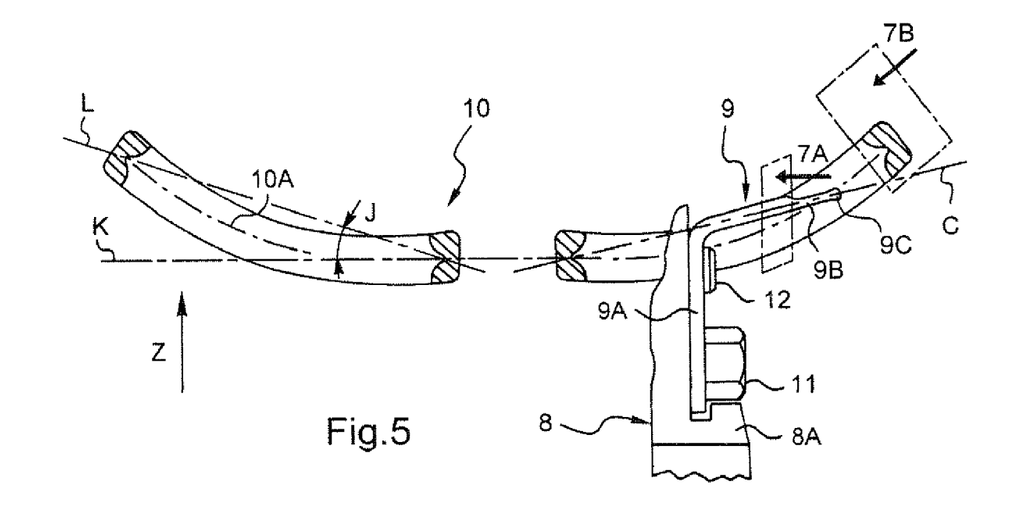
FIG. 5 is a section view of the rims of shape that is read by the feeler.

Advantageously, as shown in FIG. 5, the feeler finger 9 extends along a feeler axis C that presents a non-zero feeler angle A1 relative to the general plane K of the frame 10.

As shown in FIG. 4A, this feeler axis C presents, in the XZ plane, and relative to the axis X, a feeler angle A1 of about 15 degrees in the counterclockwise direction. Thus, the eyeglass frame 10 and the feeler 8 are arranged in such a manner that when the frame 10 is in positioned in the fastener means 3, 4, the feeler finger 9 points obliquely towards the rim of the frame 10 and towards the rear side of the frame 10 that is to be placed facing the eyes of the wearer.

Furthermore, as shown in FIG. 4B, the feeler axis C presents, in the XY plane orthogonal to the axis of rotation B of the feeler 8, and relative to the force axis E that is tangential to the slot 7, an angle AB of about 15 degrees, in the clockwise direction. Thus, the feeler finger 9 faces towards the outside of the turntable 6 and towards the outside of the circular arc described by the slot 7 relative to its circumferential direction about the carrier axis A.

The feeler finger 9 may advantageously be replaced by another feeler finger having its feeler axis presenting a feeler angle that is different and better adapted to other types of frame.

In a variant, the feeler finger 9 can be made integrally as a single piece formed with the remainder of the feeler 8. It may also be curved. Under such circumstances, the feeler axis C is defined as being the axis that is tangential to the end of the feeler finger 9.

When a frame 10 is placed in the outline reader appliance 1, each point of the frame 10 can be defined by three coordinates in three-dimensional space. The origin of the frame of reference corresponds to the center of the front face of the turntable 6, and it is possible to use a right cylindrical frame of reference in which the third axis corresponds to the axis of rotation B of the turntable 6 and defines an altitude Z of the point being felt. A point on the eyeglass frame is thus identified by its radius, its angular position T, and its altitude Z.

The outline reader appliance 1 also has an electronic and/or computer device serving firstly to control the motor-encoders 28, 31, and secondly to pick up and store the data transmitted thereto by the motor-encoders 28, 31.

In this example, particular attention is given to frames that are strongly curved, i.e. strongly cambered relative to the general plane of the rims of the frame 10. An example of such a frame is shown in FIG. 5.

The curvature (or camber) of a frame can be measured in terms of a curvature angle J. This curvature angle J corresponds to the angle formed between the general plane K of the rims of the frame 10 (a vertical plane containing the nose bridge interconnecting the rims of the frame) and the axis L defined as being the axis passing through two distinct points of the bezel 10A (typically one is located close to the nose portion of the rim and the other close to the temple portion of the rim) and that presents the greatest angle of inclination relative to the general plane K of the rims of the frame 10.

The term "strongly curved" is used herein to mean a frame in which the curvature angle J is greater than 20 degrees.

Frames 10 of this strongly curved type generally also present twisting of the bezel 10A, referred to herein as "skew".

Figure 6:
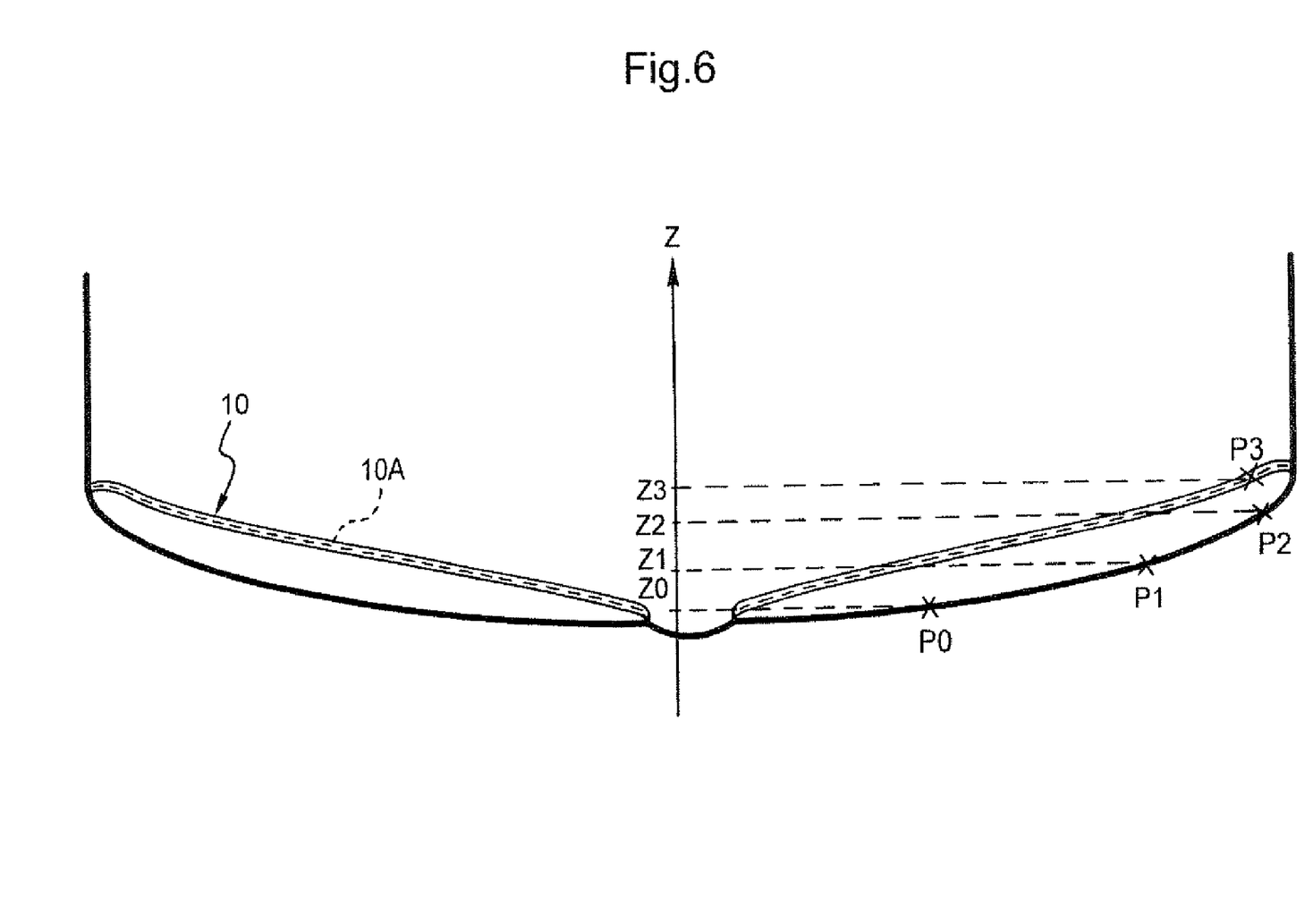
FIG. 6 is a plan view of the eyeglass frame showing the camber of each of the rims.

As can be seen in FIG. 6, four distinct zones can be distinguished on each rim of a frame 10.

Firstly there is a first zone situated close to the nose of the wearer, between P0 and P1. This first zone is cambered little and "skewed" little.

Figure 7A:
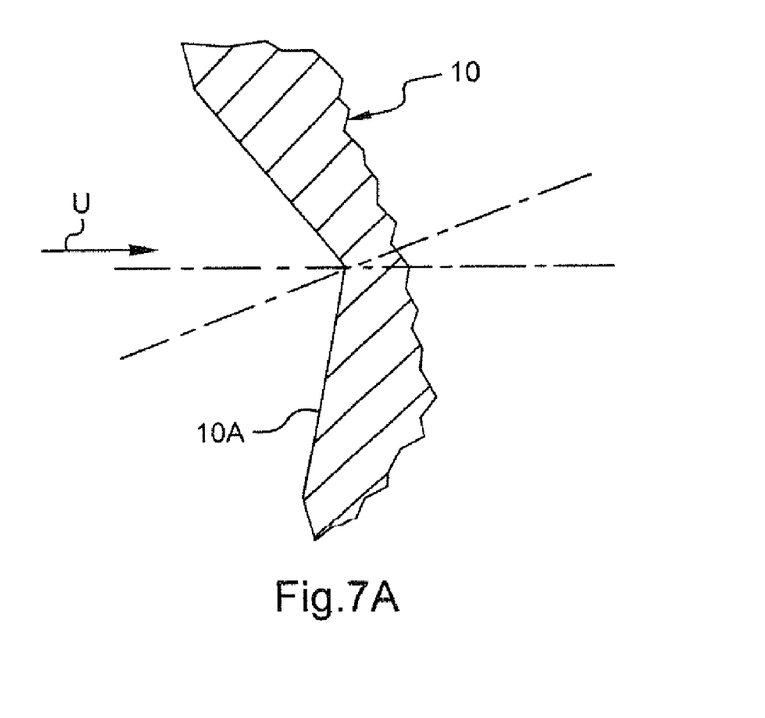
FIGS. 7A and 7B are section views of the bezel of a rim, at two points around its outline.

There can also be seen a second zone situated on the bottom portion of the frame, between P1 and P2. Along this zone, the camber and the "skew" of the frame 10 increase quickly. The magnitude of the "skew" of the frame in this zone is shown more particularly in FIG. 7A.

Figure 7B:
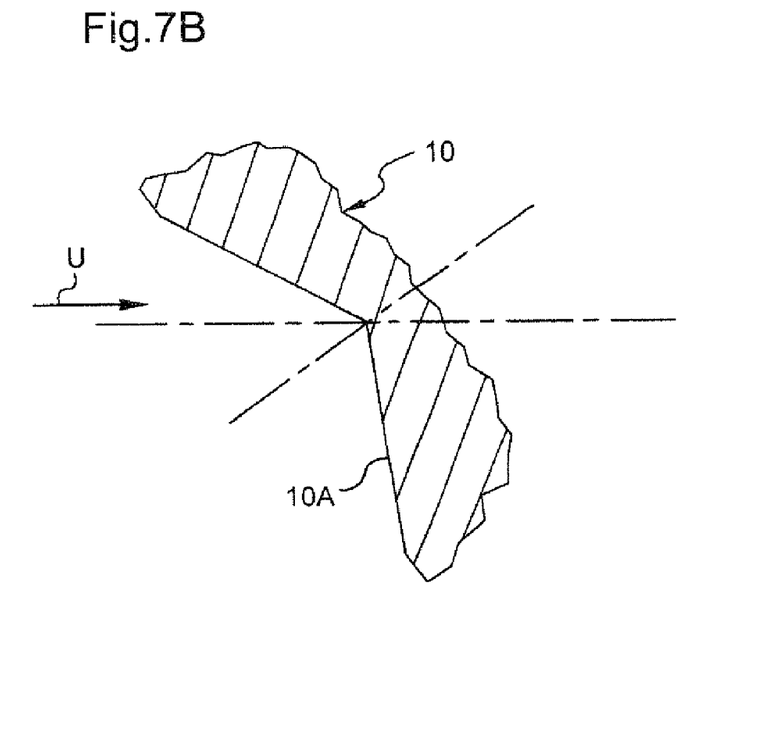

There can be seen a third zone between P2 and P3. Along this zone, the camber and the "skew" of the frame reach their maximum values and then decrease, The magnitude of the "skew" in the frame in this zone is shown more particularly in FIG. 7B.

Finally, there can be seen a fourth zone from P3 to P0. Along this zone, the "skew" and the camber of the bezel 10A decrease strongly.

It should be observed that each of these points P0, P1, P2, and P3 possesses a position along an axis Z that is referenced respectively Z0, Z1, Z2, and Z3. These positions of points along the axis Z are referred to herein as "altitudes". It should also be observed that, when the frame 10 is installed in the outline reader appliance 1, the axis Z is parallel to the axis of rotation B.

Prior to starting feeling, the eyeglass frame 10 is inserted between the studs 4 of the jaws 3 so that each of the rims of the frame 10 is ready to be felt along a path starting by inserting the feeler between two studs 4 corresponding to the bottom portion of the frame 10, and then following the bezel 10A of the frame 10 so as to cover the entire circumference of the rim of the frame 10. After this insertion, the electronic and/or computer device calibrates the weight-compensation torque Cz so that the feeler 8 is in equilibrium, regardless of its altitude Z.

In operation, the feeler 8 is initially inserted in the rim corresponding to the wearer's right eye. To do this, the plate on which the turntable 6 is mounted is moved using a motor and a rack connection (not shown) such that the center of the turntable 6 is disposed between the two pairs of studs 4 of the two jaws 3 holding the rim of the frame 10 that corresponds to the wearer's right eye.

The feeler finger 9 then automatically takes up an altitude Z0. This altitude Z0 is known and corresponds to the altitude of the point situated halfway between the two studs 4 holding the frame 10. In order to place the reader endpiece 9C at this altitude Z0, the reader subassembly 15 has an on-board mechanism enabling the feeler 8 to move parallel to the axis A. This mechanism comprises the motor-encoder 31 that is adapted to position the sleeve 20, and consequently the carrier arm 18, at the desired height along the shaft 17. The feeler 8 can thus move along the Z axis.

The feeler finger 9 then moves in the plane in which the frame 10 is held, towards the point P0 corresponding to the point situated between the two studs 4 holding the frame 10 on its low portion. To do this, combined rotary movement about the axis A is allowed to the guide arm 22 and to the carrier arm 18, thereby enabling the guide arm 22 under drive from the motor 28 in turn to drive the feeler 8 in rotation about the axis A, along the slot 7.

In this initial position, when the reader endpiece 9C is disposed at the point P0, the turntable 6 defines an angular position T of zero. The guide wheels of the turntable 6 are then capable of causing the reader subassembly 15 to turn relative to the stationary structure 5, the reader subassembly 15 being carried on the turntable 6. The motor-encoder (not shown) that drives the wheels inserted in the groove 14 serves not only to turn the turntable 6, but also to inform the electronic and/or computer device about the value of the angular position T presented by the feeler 8 relative to its initial position.

When the turntable 6 begins to turn, the value of the angular position T of the feeler 8 increases. The feeler 8 moves along the bottom of the bezel and is guided in radius and in altitude Z by the bezel 10A. When the feeler is inserted in the rim of the frame 10 that corresponds to the wearer's right eye, the feeler 8 moves in the counterclockwise direction.

Advantageously, since the feeler axis C presents a non-zero feeler angle A1 relative to the general plane K of the frame 10, no mechanical interference occurs between the feeler finger 9 and the rim of the frame 10 that is being felt. The reader endpiece 9C and the feeler finger 9 thus remain in contact with the bottom of the bezel 10A. Since the feeler axis C presents a feeler angle A1 of about 15 degrees relative to the general plane K of the frame 10, when the bezel is "skewed" by about 15 degrees, the feeler finger 9 is presented substantially orthogonally to the bezel 10A in the XZ plane (see FIG. 4A). Furthermore, when the frame 10 is not "skewed", the feeler angle A1 is small enough to avoid giving rise to mechanical interference. In the same manner, when the "skew" of the frame 10 is very great, the value of this feeler angle A1 serves to avoid any mechanical interference.

Since the advance movement of the feeler 8 on the feeler finger 6 is obtained by rotation about the axis A, the angle presented by the feeler axis C of the feeler finger 9 in the XY plane (see FIG. 4B) enables the feeler 8 to be presented in a manner that is substantially orthogonal to the tangent of the bezel of the frame at the point being felt.

Contact between the reader endpiece 9C and the bezel 10A is ensured by the motor-encoders 28 and 31. These motor-encoders exert an overall force on the feeler 8 that enables the reader endpiece 9C to remain in contact with the bottom of the bezel 10A. The minimum overall force exerted corresponds to a transverse force Ft enabling the feeler to be held against the bezel 10A and to an axial force Fa serving to counter the weight of the feeler 8 and of the carrier arm 18.

While the turntable 6 is turning, the motor-encoder 31 is thus active, however it also acts as an encoder for reading the successive positions of the carrier arm 18 along the axis A. These positions enable the electronic and/or computer device to know at all times the radial and angular coordinates of the reader endpiece 9C relative to the turntable 6. Knowing the coordinates of the center of the turntable 6 relative to the structure 5, the electronic and/or computer device can thus determine the radial and angular coordinates of the reader endpiece 9C in a stationary frame of reference tied to the structure 5.

In the same manner, the motor-encoder 31 also exerts a weight-compensation force Cz serving at least to cancel artificially the weight of the assembly constituted by the carrier arm 18 and the feeler 8. The motor-encoder 31 also acts simultaneously as an encoder, thereby enabling the electronic and/or computer device to know the altitude Z of the reader endpiece 9C of the feeler 8.

Thus, the motor-encoders together enable firstly the feeler 8 to feel the entire bezel of the frame, and secondly the electronic and/or computer device to determine the three-dimensional coordinates of the point being felt by the feeler 8, and consequently the three-dimensional coordinates of a set of points characterizing the outline of the bottom of the bezel once the feeler 8 has felt the bottom of the bezel 10A accurately.

The electronic and computer system thus controls the angular position of the feeler 8 until it reaches 360 degrees. The wheels guiding the feeler finger 6 then stop. The bezel 10A of the rim corresponding to the right eye of the wearer then presents an outline of known shape.

In order to feel the second rim of the frame, the feeler 8 moves down along the axis Z under the frame 10. The plate then moves transversely along the transfer axis D in order to reach its second position in which the center of the turntable 6 is positioned between the studs 4 of the two jaws 3 holding the rim corresponding to the left eye of the wearer.

The feeler 8 is then placed automatically at the height Z0 inside the second rim of the frame 10 to take measurement against the bezel of the second rim between the two fastener studs 4 of the bottom portion of said rim of the frame 10.

The bezel is then felt in the same manner as described above, but in the clockwise direction.

The present invention is not limited in any way to the embodiment described and shown, and the person skilled in the art can apply any variant coming within its spirit.

Figure 8:
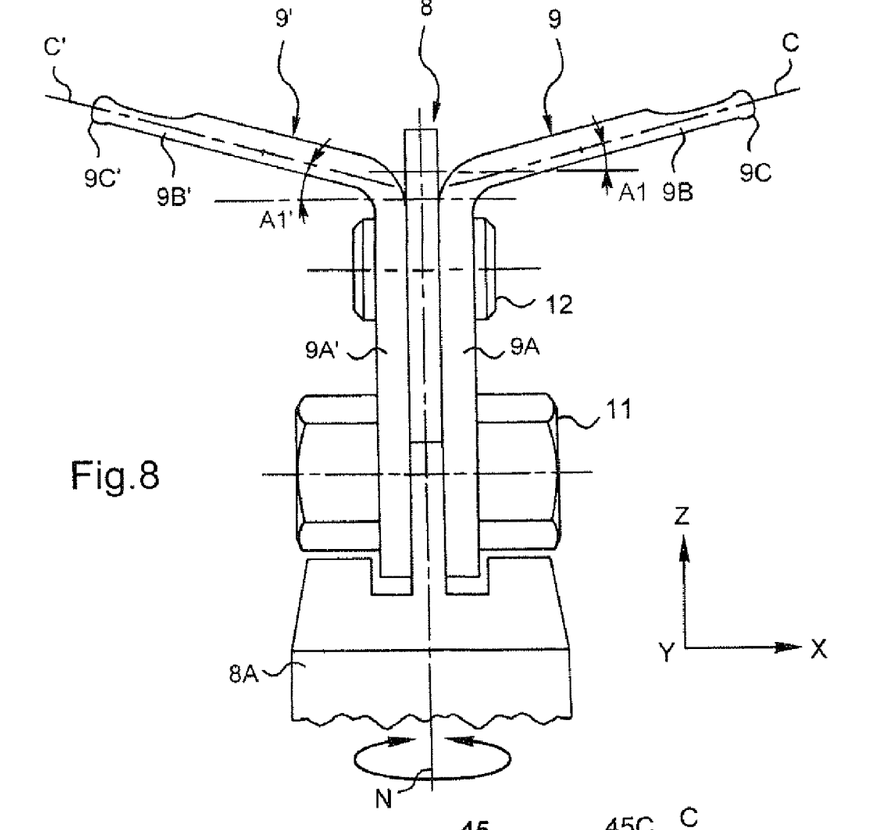
FIG. 8 is a side view of the feeler in a first variant implementation of the invention.

Thus, in a variant embodiment of the outline reader appliance 1 as shown in FIG. 8, the support rod 8A can be provided with at least two feelers 9 and 9' that can be activated selectively.

In this embodiment, the feeler 8 has two feeler fingers 9, 9': a first feeler finger 9 that is identical to that described above; and a second feeler finger 9'. The second feeler finger 9' also has a support 9A' and a terminal end 9B' provided with a reader endpiece 9C'. However, this second feeler finger 9' points along a feeler axis C' that presents a feeler angle A1' relative to the general plane K of the frame 10 that is different from the feeler angle A1. This feeler angle A1' may be equal to 25 degrees, for example. In this embodiment, the second feeler finger 9' is for feeling frames that present a very large angle of curvature J.

In this variant embodiment, the high end of the support rod 8A presents two flats parallel to the YZ plane. These two flats are for receiving the supports 9A, 9A' of the two feeler fingers 9, 9' back to back, so that they point along two axes C, C' that are coplanar.

Advantageously, the supports 9A and 9A' are not disposed symmetrically relative to the midplane of the support rod 8A. They are offset vertically (along the Z axis) so that the reader endpieces 9C, 9C' of each of the feeler fingers 9, 9' are disposed symmetrically about said midplane.

Furthermore, the feeler 8 in this embodiment presents an additional degree of freedom in movement. More precisely, the feeler 8 is adapted to pivot through 180 degrees about the axis N of the support rod 8A under drive from a motor (not shown) connected to its bottom portion.

Such a device consequently enables the feeler 8 to adapt to the curvature of the frame 10, even when the frame 10 is very greatly curved.

The feeler method in this variant implementation is performed in substantially the same manner as that described above. Each of the rims of the frame 10 is felt with the help of a first feeler finger 9. However, when the electronic and/or computer device measures an bezel altitude Z4 (e.g. 30 mm), the turntable 6 stops. The feeler 8 then pivots through 180 degrees about the axis N of the support rod 8A. Since the reader endpieces 9C, 9C' are symmetrical about the midplane of the support rod BA, the reader endpiece 9C' of the second feeler finger 9' penetrates into the bezel 10A of the frame 10 exactly in the position that was occupied by the reader endpiece 9C of the first feeler finger 9. The turntable 6 then continues its rotation.

Thereafter, when the electronic and/or computer device measures a bezel altitude Z5 (e.g. 29 mm), the turntable 6 stops again and the feeler 8 pivots again through 180 degrees about the axis N of the support rod 8A. The reader endpiece 9C of the first feeler finger 9 then becomes inserted in the bezel 10A of the frame 10 exactly in the position that was occupied by the reader endpiece 9C' of the second feeler finger 9'. The outline reader appliance 1 then finishes off feeling the bezel 10A using the first feeler finger 9.

Figure 9A:
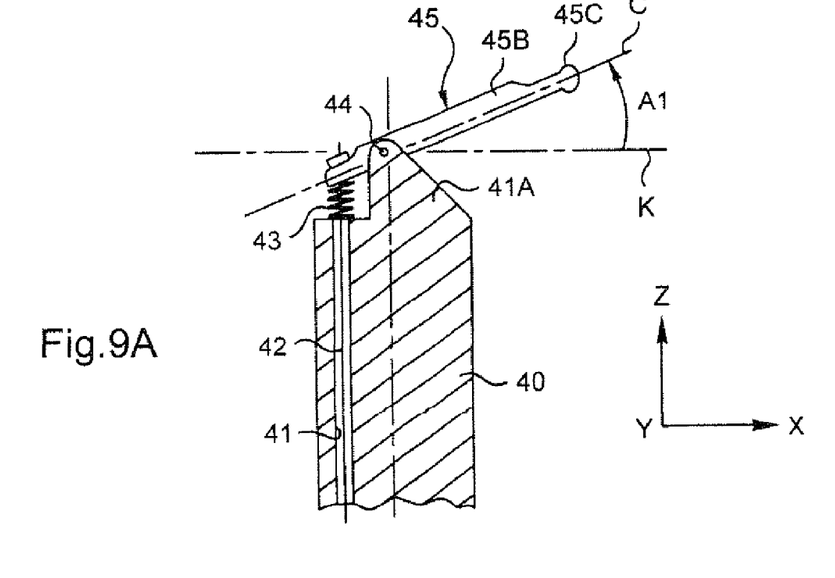
FIG. 9A is a side view of a feeler in a second variant implementation of the invention.

In a second embodiment of the outline reader appliance 1, the feeler support rod 40 is provided with a feeler 45 pointing along a feeler axis C presenting a feeler angle A1 relative to the general plane K of the frame 10 that varies continuously while reading a rim of an eyeglass frame 10.

As shown in FIG. 9A, the support rod 40 is pierced longitudinally by an open duct 41 that is off-center relative to the axis of the support rod 40. Its top end also has two lugs 41A relative to the XZ plane defining a gap between them. These two lugs 41A are triangular in shape, with top vertices that are pierced by respective openings. These two openings pierced in the ribs receive as a force fit a cylindrical pin 44 that extends along the axis Y.

The feeler finger 45 is in the form of a cylindrical rod that carries at one of its ends a reader endpiece 45C similar to the reader endpiece described for the first embodiment of the invention. This feeler finger 45 is also pierced transversely by a bore engaged on the cylindrical pin 44. The feeler finger 45 is thus adapted to pivot in said gap about the cylindrical pin 44 so that the feeler axis C along which the feeler finger 45 points presents a variable feeler angle A1 relative to the general plane K of the frame 10.

In order to control the value of this feeler angle A1, a wire 42 is fastened to the end of the feeler finger 45 that is opposite from the reader endpiece 45C. This wire 42 extends along the open duct 41 in the support rod 40. The other end of the wire 42 is connected to a reel secured to a motor (not shown) around which the wire is wound. Winding the wire onto the reel thus serves to shorten the working length of the wire 42, and consequently to increase the value of the feeler angle A1.

In order to reduce the value of the feeler angle A1, the support rod 40 includes return means for returning the feeler finger 45 into a position in which it is parallel with the general plane K of the frame 10 when the reel unwinds the wire 42. The return means comprise a compression spring 43 disposed around the opening of the open duct 41, between the end of the feeler finger 45 to which the wire 42 is attached and the top end of the support rod 40. Thus, when the motor unreels the wire, the compression spring exerts a vertical force onto the end of the feeler finger 45, thereby decreasing the value of the feeler angle A1.

The feeling method is implemented in a manner that is substantially identical to that described for the first implementation of the invention More precisely, the feeler finger 45 is initially inserted in the bezel 10A of the rim of the frame 10 between the two pairs of studs 4 of the two jaws 3 holding the rim of the frame that corresponds to the wearer's right eye. During this step, the motor connected to the reel of wire 42 is stopped so that the feeler angle A1 is zero. The turntable 6 then begins to pivot in such a manner that the reader endpiece 45C of the feeler finger 45 moves along the bottom of the bezel 10A.

The electronic and/or computer system is then designed to control variation in the feeler angle A1 as a function of the altitude read for the bezel 10A. In a variant, it could be designed to control this angle as a function of the angular position T of the turntable 6, or indeed as a function of the radius read for the point being felt on the bezel 10A relative to the center of the turntable 6.

In any event, the electronic and/or computer system controls the feeler angle A1 so that it is at a maximum in the temple zone of the rims of the frame 10 and at a minimum in the nose zone, regardless of the greatest overall dimension of the rims of the frame lying in the range 125 mm to 150 mm. The term "temple" zone is used to mean the zone of each rim that is in the vicinity of the point where it connects with a temple branch of the frame, and the term "nose" zone is used to designate the zone of each rim that is in the vicinity of its point of connection with the bridge of the frame. The greatest overall dimension of each rim corresponds to the greatest diameter of each rim of the frame.

In this implementation, when the electronic and/or computer system measures a bezel altitude Z less than Z0, the motor connected to the reel of wire 42 holds the reel in a position such that the feeler angle A1 remains zero. In contrast, on measuring a bezel altitude greater than Z0, it causes the feeler angle to be varied continuously in application of the formula:

$$A1 = f(Z-Z0)$$

where the altitudes Z and Z0 are expressed in millimeters and the feeler angle A1 in degrees. The function f used could for example be the "identity function".

In this implementation, when the motor causes the reel to turn so as to change the feeler angle A1, the electronic and/or computer system controls the motor-encoders 28, 31 and also the angular position of the turntable 6 in such a manner that the reader endpiece 45C remains in contact with the point being felt of the bezel 10A. This control serves to cause the altitude Z of the support rod 40 to vary and also its radial position on the turntable 6, so that the point felt by the reader endpiece 45C remains the same in spite of variation in the feeler angle A1.

Figure 9B:
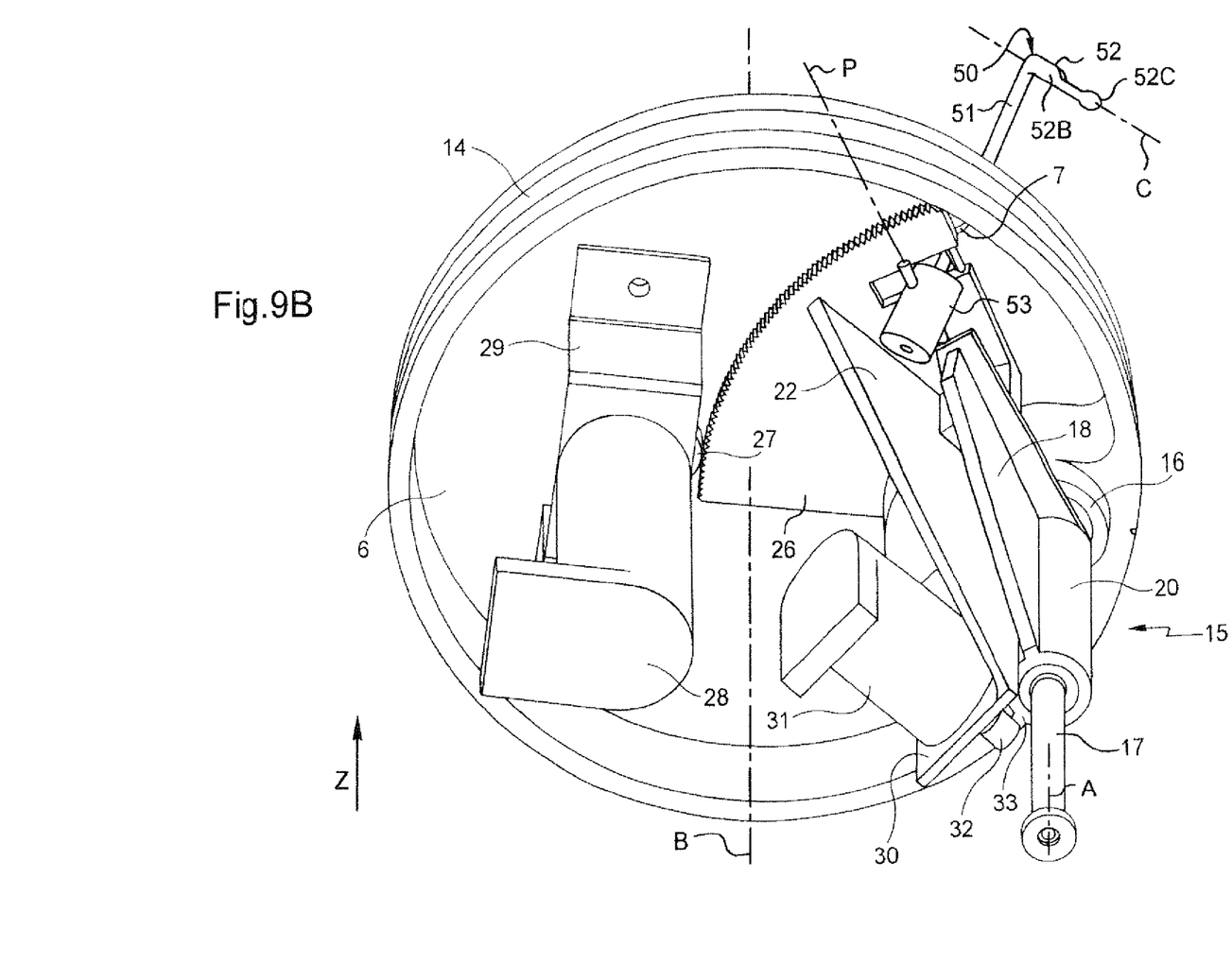
FIG. 9B is a perspective view of the turntable seen from beneath when removed from the appliance of FIG. 1 and carrying a feeler constituting a variant of the second implementation of the invention.

Tn a variant, and as shown in FIG. 9B, in order to modify the feeler angle A1 while reading the bezel 10A of each rim, the feeler 50 can be mounted to pivot about an axis P along which the carrier arm 18 points.

In this variant, the feeler 50 comprises a single cylindrical rod 51 carrying a feeler finger 52 made integrally therewith. This feeler finger 52 also has a terminal end 52B with a substantially spherical reader endpiece 52C being placed at the end thereof.

The outline reader appliance 1 also comprises a carrier arm 18 mounted on the carrier arm 17. At one of its ends, the carrier arm 18 has a sleeve 20 enabling the carrier arm 18 to turn about the carrier axis A and also to move in translation along said axis. At its end remote from the sleeve 20, the carrier arm 18 has a cylindrical support 53 mounted to pivot about the axis P along which said arm points. This cylindrical support 53 is turned by a motor (not shown) secured to the carrier arm 18. Pivoting of the ring 53 relative to the carrier arm 18 thus serves to modify the direction of the feeler axis C along which the feeler finger 52 points, and thus serves to vary the feeler angle A1.

The feeler method is implemented identically to the manner described above for the second implementation of the invention.

The invention claimed is:

1. A method of reading the outline of a bezel (10A) of a rim of an eyeglass frame (10), the method including a contacting step of putting the bottom of the bezel (10A) into contact with a feeler finger (9; 9'; 45; 52) belonging to a feeler (8) and pointing along a feeler axis (C) or with a feeler blade belonging to a feeler (8) and extending along a feeler plane, and a feeling step during which the feeler (8) is moved along the bezel (10A) to feel the bottom of the bezel (10A) while turning about an axis of rotation (B), the method being characterized in that the feeler blade or finger (9; 9'; 45; 52), at least when located in a temple zone of the rim of the frame (10), points obliquely towards the rim of the frame (10) and towards its rear side that is to be placed facing the eyes of a wearer, such that the feeler axis (C) or the feeler plane forms a non-zero feeler angle (A1) with a plane orthogonal to the axis of rotation (B) of the feeler (8).

2. An outline reading method according to claim 1, in which, during the feeling step, the feeler blade or finger (9; 9'; 45; 52) when placed in a nose zone of the rim of the frame (10) points obliquely either towards the rim of the frame (10) and towards its rear side, or else towards the rim of the frame (10) and towards its front side with a feeler angle (A1) of less than 20 degrees.

3. An outline reading method according to claim 1, in which, during the feeling step, the feeler blade or finger (9; 9'; 45; 52) points obliquely towards the rim of the frame (10) and towards its rear side regardless of the location on the rim at which it is disposed.

4. An outline reading method according to claim 1, in which, prior to the contacting step, provision is made for positioning the eyeglass frame (10) relative to the axis of rotation (B) independently of its greatest overall dimension.

5. An outline reading method according to claim 1, in which the greatest overall dimension of the rim of the frame (10) lies in the range 125 mm to 150 mm.

6. An outline reading method according to claim 1, in which, during the feeling step, the feeler (8) turns through 360 degrees about its axis of rotation (B).

7. An outline reading method according to claim 1, in which, prior to the contacting step, a step is performed of blocking the frame (10) in holder means (3, 4) that define a general plane (K) orthogonal to the axis of rotation (B) of the feeler (8).

8. An outline reading method according to claim 1, in which, during the feeling step, the feeler blade or finger (9; 9'; 45; 52), when it is placed in the temple zone of the rim of the frame (10), points obliquely towards the rim of the frame (10) and towards its rear side with a feeler angle (A1) that is less than or equal to 40 degrees.

9. An outline reading method according to claim 1, in which, during the feeling step, there is at least one occasion on which the feeler (8) points obliquely towards the rim of the frame (10) and towards its rear side with a feeler angle (A1) that is greater than or equal to 5 degrees.

10. An outline reading method according to claim 1, in which the feeling step is performed by causing a substantially spherical reader endpiece (9C; 9C'; 52C) at the terminal end (9B; 9B'; 52B) of the feeler finger (9; 9'; 52) to slide along the bottom of the bezel (10A) of the rim of the eyeglass frame (10).

11. An outline reading method according to claim 10, in which the terminal end (9B; 9B'; 52B) of the feeler finger (9; 9'; 52) presents thickness that is less than the diameter of the reader endpiece (9C; 9C'; 52C).

12. An outline reading method according to claim 1, in which the feeler angle (A1) is not changed while reading the rim of the frame (10).

13. An outline reading method according to claim 12, in which the feeler angle (A1) lies in the range 10 degrees to 20 degrees, and is preferably 15 degrees.

14. An outline reading method according to claim 12, in which the feeler finger (9) is removable.

15. An outline reading method according to claim 14, in which the feeler (8) has at least two interchangeable feeler fingers (9) that, when mounted, present different feeler angles (A1).

16. An outline reading method according to claim 12, in which the feeler (8) has a plurality of feeler fingers (9, 9') that can be activated selectively.

17. An outline reading method according to claim 1, in which the feeler angle (A1) is caused to vary during the feeling step.

18. An outline reading method according to claim 17, in which the feeler angle (A1) is at a maximum when the feeler (8) is feeling the temple zone of the rim of the frame (10).

19. An outline reading method according to claim 17, in which the feeler angle (A1) is at a minimum when the feeler (8) is feeling a nose zone of the rim of the frame (10).

20. An outline reading method according to claim 17, in which, for a feeler (8) having a plurality of feeler fingers (9, 9') that are selectively activatable, provision is made to activate at least two distinct feeler fingers (9, 9') successively during the feeling step.

21. An outline reading method according to claim 17, in which, during the feeling step, provision is made to cause the feeler angle (Al) to vary continuously as a function of the three-dimensional position of the feeler finger (45).

22. An outline reading method according to claim 1, in which, when the feeler (8) is mounted to pivot about a carrier axis (A) parallel to the axis of rotation (B), the feeler blade or finger (9; 9'; 45; 52) points towards the outside of the circle described by the feeler (8) turning about the carrier axis (A) with a non-zero angle relative to its circumferential direction about said carrier axis (A).

23. An outline reading method according to claim 22, in which the feeler blade or finger (9; 9'; 45; 52) points towards the outside of the circle described by the feeler (8) about the carrier axis (A) with an angle lying in the range 10 degrees to 20 degrees, and preferably equal to 15 degrees, relative to its circumferential direction about said carrier axis (A).

24. An outline reading method according to claim 1, in which the feeler (8) is moved by motor means (28, 31) controlled by electronic and/or computer means in such a manner that the feeler blade or finger (9; 9'; 45; 52) remains continuously in contact with the bottom of the bezel (10A).

25. An outline reading method according to claim 1, in which the eyeglass frame (10) is strongly curved and presents, between its general plane (K) and an axis (L) passing through two points of the bezel (10A) and presenting the greatest angle of inclination relative to the general plane (K), an angle of curvature (J) that is greater than 20 degrees.

* * * * *

UNITED STATES PATENT AND TRADEMARK OFFICE
CERTIFICATE OF CORRECTION

PATENT NO. : 7,661,197 B2  Page 1 of 1
APPLICATION NO. : 12/094620
DATED : February 16, 2010
INVENTOR(S) : Ludovic Jouard It is certified that error appears in the above-identified patent and that said Letters Patent is hereby corrected as shown below:

In column 11, the paragraph beginning on line 60 should be separated from next sentence by a period and begin a new paragraph and read as follows:

--The feeling method is implemented in a manner that is substantially identical to that described for the first implementation of the invention.

More precisely, the feeler finger 45 is initially inserted in the bezel 10A of the rim of the frame 10 between the two pairs of studs 4 of the two jaws 3 holding the rim of the frame that corresponds to the wearer's right eye. During this step, the motor connected to the reel of wire 42 is stopped so that the feeler angle Al is zero. The turntable 6 then begins to pivot in such a manner that the reader endpiece 45C of the feeler finger 45 moves along the bottom of the bezel 10A.--.

In column 12, line 46 amend the first word "Tn" to read: --In--.

Signed and Sealed this

Eighteenth Day of May, 2010

David J. Kappos
*Director of the United States Patent and Trademark Office*